(12) United States Patent
Ito et al.

(10) Patent No.: US 8,479,699 B2
(45) Date of Patent: Jul. 9, 2013

(54) INTAKE APPARATUS FOR INTERNAL COMBUSTION ENGINE

(75) Inventors: Atsushi Ito, Anjo (JP); Eiji Sakagami, Chiryu (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 1013 days.

(21) Appl. No.: 12/373,861

(22) PCT Filed: Jul. 17, 2007

(86) PCT No.: PCT/JP2007/064395
§ 371 (c)(1),
(2), (4) Date: Jan. 14, 2009

(87) PCT Pub. No.: WO2008/010589
PCT Pub. Date: Jan. 24, 2008

(65) Prior Publication Data
US 2009/0288629 A1    Nov. 26, 2009

(30) Foreign Application Priority Data

Jul. 20, 2006   (JP) ................................. 2006-198358

(51) Int. Cl.
*F02M 35/10*    (2006.01)
(52) U.S. Cl.
USPC ................................. 123/184.55; 123/184.42
(58) Field of Classification Search
USPC .......... 123/184.55, 184.61, 543, 585, 184.41, 123/184.45, 190.2, 403, 190.1, 1, 90.17, 123/184.56; 251/162, 305
See application file for complete search history.

(56) References Cited

U.S. PATENT DOCUMENTS

| | | | |
|---|---|---|---|
| 4,646,698 A | 3/1987 | Inoue et al. | |
| 5,526,780 A | 6/1996 | Wallis | |
| 6,138,628 A * | 10/2000 | Alex et al. | 123/190.1 |
| 6,588,389 B1 * | 7/2003 | Jessberger et al. | 123/184.55 |
| 2003/0213456 A1 * | 11/2003 | Klotz et al. | 123/190.1 |

FOREIGN PATENT DOCUMENTS

| | | |
|---|---|---|
| DE | 19528014 A1 | 2/1997 |
| DE | 19944108 A1 | 3/2001 |
| EP | 1340892 A2 | 9/2003 |

(Continued)

OTHER PUBLICATIONS

International Search Report for PCT/JP2007/064395 completed Oct. 8, 2007.
Written Opinion of the International Searching Authority completed Oct. 8, 2007.

(Continued)

*Primary Examiner* — Noah Kamen
(74) *Attorney, Agent, or Firm* — Buchanan Ingersoll & Rooney PC

(57) ABSTRACT

An intake apparatus for an internal combustion engine comprises an intake manifold (1) with air feeding passages (3) adapted to be connected to and feed air to cylinders of an engine; a rotary valve (10) including a plurality of valve portions (11) in communication with the air feeding passages (3) through feed switch openings (7); a sealing member (60) fitted to the valve portion, the sealing member including ring portions (61) and interconnecting portions interconnecting the ring portions, recessed portions (76) defined on an outer side of the valve portions for receiving engaging portions (64) on inner sides of the interconnecting portions of the sealing members, wherein when the rotary valve is in the closed position, a first sealing gap (A) between the engaging portion and an inner face (77) of the recessed portion is set smaller than a valve gap (C) between the valve portion and the bore portion (8).

9 Claims, 10 Drawing Sheets

FOREIGN PATENT DOCUMENTS

| | | |
|---|---|---|
| JP | 8-503047 A | 4/1996 |
| JP | 2001-519006 A | 10/2001 |
| JP | 2002-130063 A | 5/2002 |
| JP | 2002-130064 A | 5/2002 |
| JP | 2003-083072 A | 3/2003 |
| JP | 2005-113873 A | 4/2005 |
| WO | 94/11618 A1 | 5/1994 |

OTHER PUBLICATIONS

International Preliminary Report on Patentability completed Nov. 10, 2008.
Office Action issued by the Japanese Patent Office in corresponding Japanese Patent Application No. 2006-198358 dated Oct. 7, 2010 and English language translation of Office Action.

* cited by examiner

Fig.16
(a)
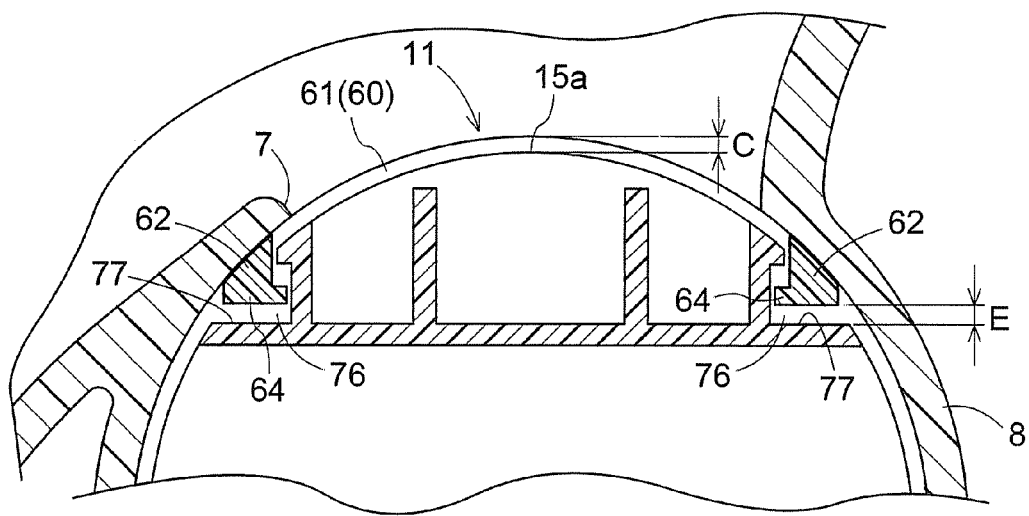
(b)
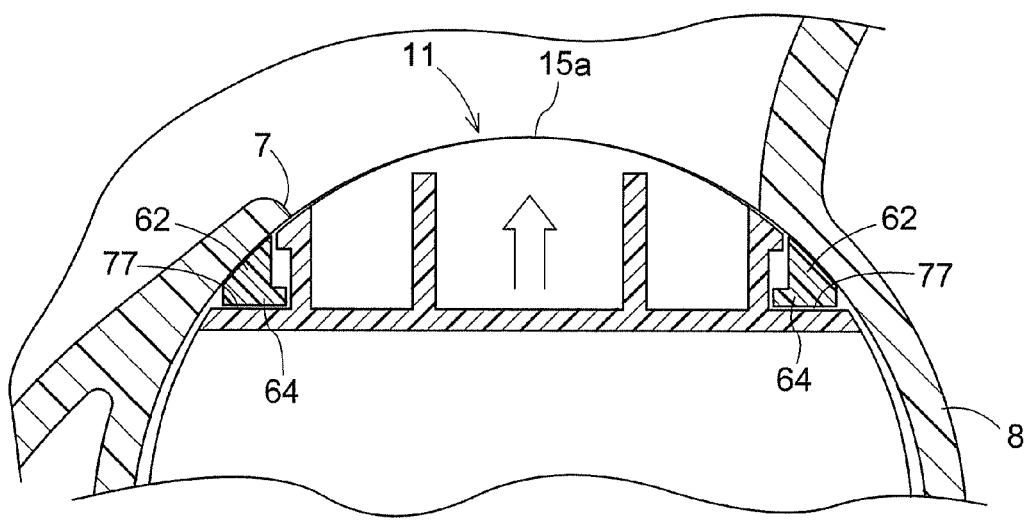

US 8,479,699 B2

INTAKE APPARATUS FOR INTERNAL COMBUSTION ENGINE

TECHNICAL FIELD

The present invention is directed to an intake apparatus for an internal combustion engine.

BACKGROUND ART

An intake apparatus for an internal combustion engine is known from e.g. U.S. Pat. No. 6,138,628.

The intake apparatus for an internal combustion engine disclosed in this patent comprises an intake manifold and a camshaft controller disposed within the intake manifold.

The intake manifold forms a plurality of air feeding passages with individual induction tubes and shorter individual induction tubes for respectively feeding air to a plurality of cylinders of the internal combustion engine.

The camshaft controller includes a plurality of portions that have openings and that are rotatable together. Each portion is operable to open and close an individual induction tube associated therewith.

Each portion of the camshaft controller includes a sealing cage. This sealing cage includes a pair of ring elements and sealing bars connecting the pair of ring elements to each other. Each ring element is fitted within a groove located at a corresponding end of the valve portion.

This type of intake apparatus has an arrangement whose general principle is illustrated in FIGS. 16(a) and 16(b). It is to be understood that FIGS. 16(a), 16(b) and the description here are provided for the sole purpose of illustrating the operational principles of prior art and that they do not constitute any admission as to prior disclosure of specific configurations of the apparatus. These figures show how the feed switch opening 7 is closed by a valve portion 11.

As shown, each of the interconnecting portions 62 of a sealing member 60 has an engaging portion 64 disposed on the inner side. Each engaging portion 64 is received by a corresponding recessed portion 76 disposed on the outer peripheral side of the valve portion 11.

A sealing gap E is provided between each engaging portion 64 and an inner face portion 77 of the corresponding recessed portion 76. The inner face portion 77 is located on the side opposite from the other side where the feed switch opening 7 of the intake manifold 1 is located, relative to the engaging portion 64, when the feed switch portion 7 is closed by the valve portion 11.

In general, the valve portions 11 and the sealing members 60 are formed by resin molding. Therefore, if the sealing gap E is small, an engaging portion 64 may come into contact with the corresponding inner face portion 77 of the recessed portion 76 due to manufacturing variations in the valve portions 11 and the sealing members 60. When this happens, the interconnecting portion 62 will be pressed against a bore portion 8, which results in an increase in resistance in the switching operation of the valve portion 11. Therefore, the sealing gap E is configured so as to avoid such contact between the engaging portions 64 and the inner face portions 77, regardless of the manufacturing variations in the valve portions 11 and the sealing members 60.

For this reason, the sealing gap E was conventionally set larger than a valve gap C provided between the outer peripheral edge 15a of each valve portion 11 and the bore portion 8. A result was a problem illustrated in FIG. 16(b).

Specifically, when the rotary valve is switched to the closed position so that the valve portions 11 close the feed switch openings 7, the rotary valve starts to vibrate due to e.g. pulsation of intake air generated in the air feeding passages caused by operation of the internal combustion engine. As a result, the rotary valve will be deformed such that the valve portions 11 are repeatedly displaced toward and away from the respective feed switch openings 7. The displacement of a valve portion 11 toward the corresponding feed switch opening 7 causes movement of the valve portion 11 relative to the sealing member 60, which leads eventually to collisions of the outer peripheral edge of the valve portion 11 against the bore portion 8 in the vicinity of the feed switch opening 7, thus casing a collision noise.

DISCLOSURE OF THE INVENTION

An object of the present invention is to provide an intake apparatus for an internal combustion engine, which can reduce generation of such collision noise described above.

According to an aspect of the present invention, in an intake apparatus for an internal combustion engine, the apparatus comprises an intake manifold including a plurality of air feeding passages that define feed switch openings and a bore portion and that are adapted to be connected to and feed air to a plurality of cylinders of an internal combustion engine when the air feeding passages are connected to the internal combustion engine;

a rotary valve defining an axial direction and including a plurality of valve portions that are rotatable together and each of which is in communication with corresponding one of the air feeding passages through corresponding one of the feed switch openings, the rotary valve located in the bore portion and being supported to the intake manifold to be rotatably switched between an open position wherein the plurality of valve portions open the feed switch openings and a closed position wherein the plurality of valve portions close the feed switch openings;

a sealing member fitted to each of the valve portions, the sealing member including a pair of ring portions, each of which engages corresponding one of opposite ends of the valve portion in the axial direction and at least two interconnecting portions interconnecting the pair of ring portions, each of the sealing members providing sealing between associated one of valve portions and the bore portion of the intake manifold, the interconnecting portions being generally located along the feed switch opening and radially between the valve portion and the bore portion when the rotary valve is switched to the closed position; and a pair of recessed portions defined on an outer side of each of said valve portions for receiving engaging portions defined on inner sides of the interconnecting portions of each of the sealing members, and wherein when the rotary valve is switched to the closed position, a first sealing gap between the engaging portion and an inner face of the recessed portion located on a side opposite, with respect to the engaging portion, from the other side where the feed switch opening is located, is set smaller than a valve gap provided between the valve portion and the bore portion.

With the arrangement described above, even in the event of displacement of the valve portion toward the feed switch opening, if this displacement reaches the distance or length of the sealing gap, the inner face portion comes into contact with the engaging portion, whereby the interconnecting portions prevent further movement of the valve portion, thus preventing displacement and eventual collision of the valve portion against the bore portion.

Further, the inner face portion is preferably formed so as to set the sealing gap at a predetermined value, taking possible manufacturing variations in the inner face portion into consideration, which would help prevent the interconnecting portions from being pressed against the bore portion by the inner face portion in normal operation.

Therefore, an intake apparatus in accordance with the present invention is one which facilitates switching operation of the rotary valve and which can feed air to the internal combustion engine with less noise due to decreased generation of collision noise between the valve portion and the bore portion.

Another aspect of the present invention is that when the rotary valve is switched to the closed position, a second sealing gap between the engaging portion and a second inner face portion of the receiving recessed portion, located closer to the feed switch opening than the engaging portion, is greater than the first sealing gap, and wherein a sum of the first sealing gap and the second sealing gap is greater than the valve gap.

With the above arrangement, even when the valve portion is displaced away from the feed switch opening, it is possible to prevent the second inner face portion of the recessed portion from coming into contact with the engaging portion. As a result, regardless of displacement of the valve portion, the sealing member will not be operated away from the bore portion by the valve portion, whereby assuring continued sealing between the valve portion and the bore portion.

Another aspect of the present invention is that when the rotary valve is switched to the closed position, an inner face portion of the receiving recessed portion located on the side opposite, with respect to the engaging portion, from a side where the feed switch opening is present includes a first portion with a third sealing gap between the first portion and the engaging portion and a second portion with a fourth sealing gap between the second portion and the engaging portion, and wherein the third sealing gap is smaller than the valve gap, and the fourth sealing gap is greater than the third sealing gap.

The first portion will be formed as to set the third sealing gap at a predetermined value, with consideration to possible manufacturing variations in the inner face portion. The interconnecting portions can then be prevented from being pressed against the bore portion by the inner face portion in normal operation. Further, since the fourth seal gap relative to the engaging portion is greater at the second portion than at the first portion, the second portion can be manufactured with lower manufacturing precision than the first portion.

Consequently, it is possible to obtain a less costly and high quality intake apparatus which can avoid collision noise between the valve portion and the bore portion and which facilitates or allows light and smooth operation of the rotary valve.

Another aspect of the present invention is that the first portion of the inner face portion of the receiving recessed portion is provided at each of opposite ends of the valve portion in the axial direction and the second portion of the inner face portion of the receiving recessed portion is provided at an intermediate portion of the valve portion in the axial direction.

With the arrangement described above, when the valve portion is displaced toward the feed switch opening, the collision between the valve portion and the bore portion can be avoided by having the first portions located at the opposite ends in the axial direction contact the engaging portion. And, as described above, the second portion can be manufactured with lower manufacturing precision than the first portion, making it possible to obtain a less costly and high quality intake apparatus which can help avoid the collision noise between the valve portion and the bore portion and which facilitates or allows light and smooth operation of the rotary valve.

Another aspect of the present invention is that the first portion of the inner face portion of the receiving recessed portion is provided at one of opposite ends of the valve portion in the axial direction and the second portion of the inner face portion of the receiving recessed portion is provided at the other of the opposite ends of the valve portion in the axial direction.

With the arrangement described above, the valve portion being displaced toward the feed switch is caused to be supported by the contact with the engaging portion at the first portion located in this valve portion and the contact with the engaging portion at the first portion located in the valve portion adjacent to the foregoing valve portion. As the valve portion is supported by the first portion of the first valve portion and also by the first portion of the adjacent valve portion, it is possible to increase the length of the second portion of each valve portion along the axial direction. Consequently, this may also contribute to obtaining a less expensive and high quality intake apparatus which can avoid collision noise between the valve portion and the bore portion and which facilitates or allows light and smooth operation of the rotary valve.

BRIEF DESCRIPTION OF THE DRAWINGS

The foregoing and additional features and characteristics of the present invention will become more apparent from the following detailed description considered with reference to the accompanying drawings, wherein:

FIG. 16(a) is a sectional view showing a closed condition or position of a conventional valve portion; and FIG. 16(*b*) is a sectional view showing a displaced condition of the conventional valve portion.

BEST MODE FOR CARRYING OUT THE INVENTION

Next, embodiments of the present invention will be described with reference to the accompanying drawings. In the following description, a term "portion", if not explicitly specified, may be an integral part of a member or may be formed as a separate part. When something is said to be "defined" by an object, if not explicitly specified, it may be actually defined by the object or may be defined by a separate part which may be considered to be a part of the object.

First Embodiment

Figure 1:
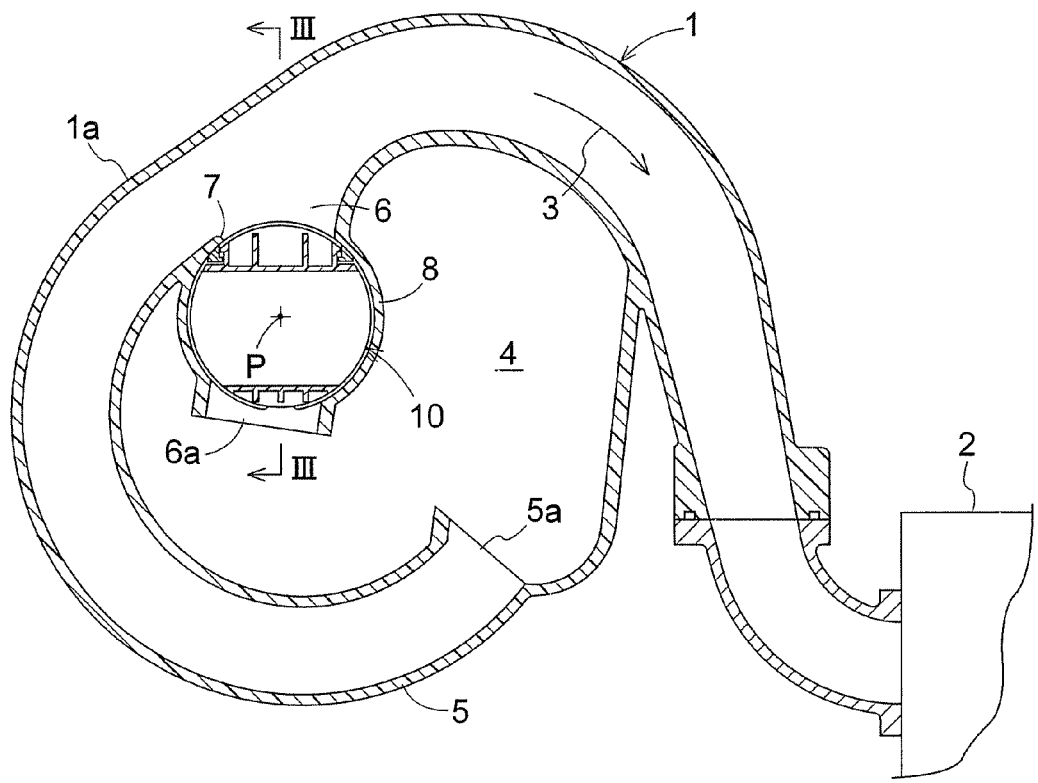
FIG. 1 is a vertical sectional view of an intake apparatus for an internal combustion engine.
Figure 3:
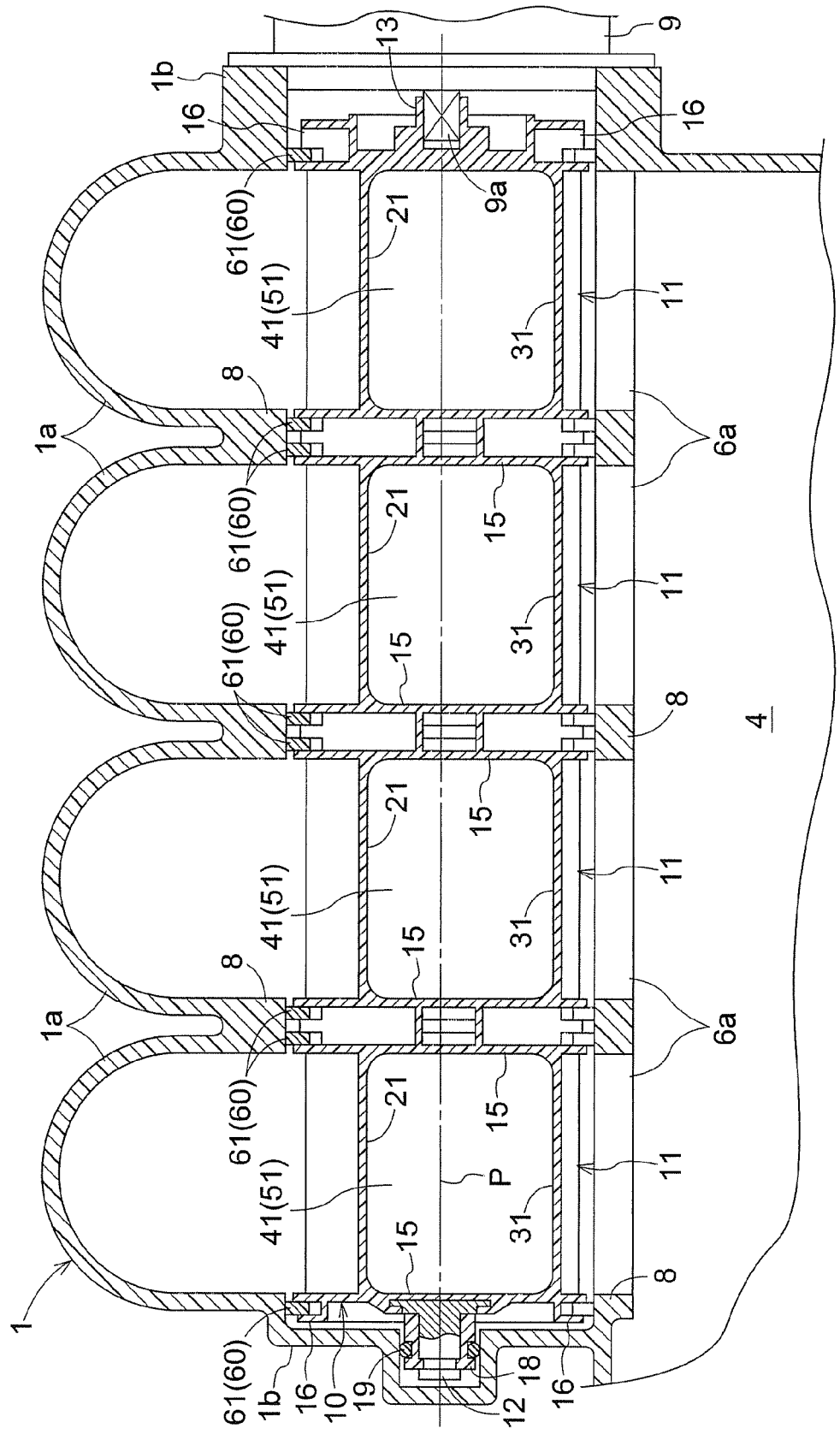
FIG. 3 is a sectional view taken along III-III in FIG. 1.

FIG. 1 is a vertical sectional view showing an intake apparatus for an internal combustion engine in accordance with an embodiment of the present invention. FIG. 3 is a sectional view taken at III-III in FIG. 1. As shown in these figures, the intake apparatus for an internal combustion engine in accordance with the embodiment of the invention includes an intake manifold 1 and a rotary valve 10 incorporated within this intake manifold 1 and the apparatus is mounted to a four-cylinder type internal combustion engine 2.

The intake manifold 1 includes four intake pipe-like or tubular members 1*a* connected in series and integrally formed with each other, with these four intake pipe-like members 1*a* forming four air feeding passages or conduits 3 connected respectively to the four cylinders of the internal combustion engine 2. As shown in FIG. 1, the intake manifold 1 further includes a surge tank 4 connected to the four intake pipe-like members 1*a* Each air feeding passage 3 includes a long port 5 having an inlet opening 5*a* that opens to the surge tank 4 and a short port 6 having an inlet opening 6*a* that opens to the surge tank 4. The four intake pipe-like members 1*a* and the surge tank 4 of the intake manifold 1 are formed by resin molding.

The rotary valve 10 is supported to a pair of axial bearing portions 1*b* of the intake manifold 1 with the rotary valve 10 being inserted into and through a bore portion 8 having feed switch openings 7 for the respective short ports 6. Further, this rotary valve 10 is rotatably driven about an axis P by means of an actuator 9 having an output shaft 9*a* operatively coupled with a support shaft 13 provided at one extreme end of this rotary valve 10, so that the rotary valve 10 is switched between a closed condition or a closed position where each feed switch opening 7 of the respective short port 6 is closed and an open condition or a closed position where each feed switch opening 7 of the respective short port 6 is closed.

When the internal combustion engine 2 rotates at a low speed, the rotary valve 10 is switched to the closed condition or closed position to close each short port 6 so that it is no longer communicated with the surge tank 4, which switches each air feeding passage 3 to an air feeding mode for low speed (or a low speed air feeding mode). As a result, each air feeding passage 3 feeds air, which is introduced into the surge tank 4 from a throttle (not shown), to the cylinders as combustion air through the long port 5 by the suction action of the cylinders. When the internal combustion engine 2 rotates at a high speed, the rotary valve 10 is switched to the open condition or the open position to open each short port 6 to be in communication with the surge tank 4, which switches each air feeding passage 3 to an air feeding mode for high speed (or a high speed air feeding mode). As a result, each air feeding passage 3 feeds air, which is introduced to the surge tank 4, to the cylinders as combustion air through the short port 6 by the suction action of the cylinders. In case of the high-speed air feeding mode, the long port 5 in each air feeding passage is also communicated with the surge tank 4.

Figure 8:
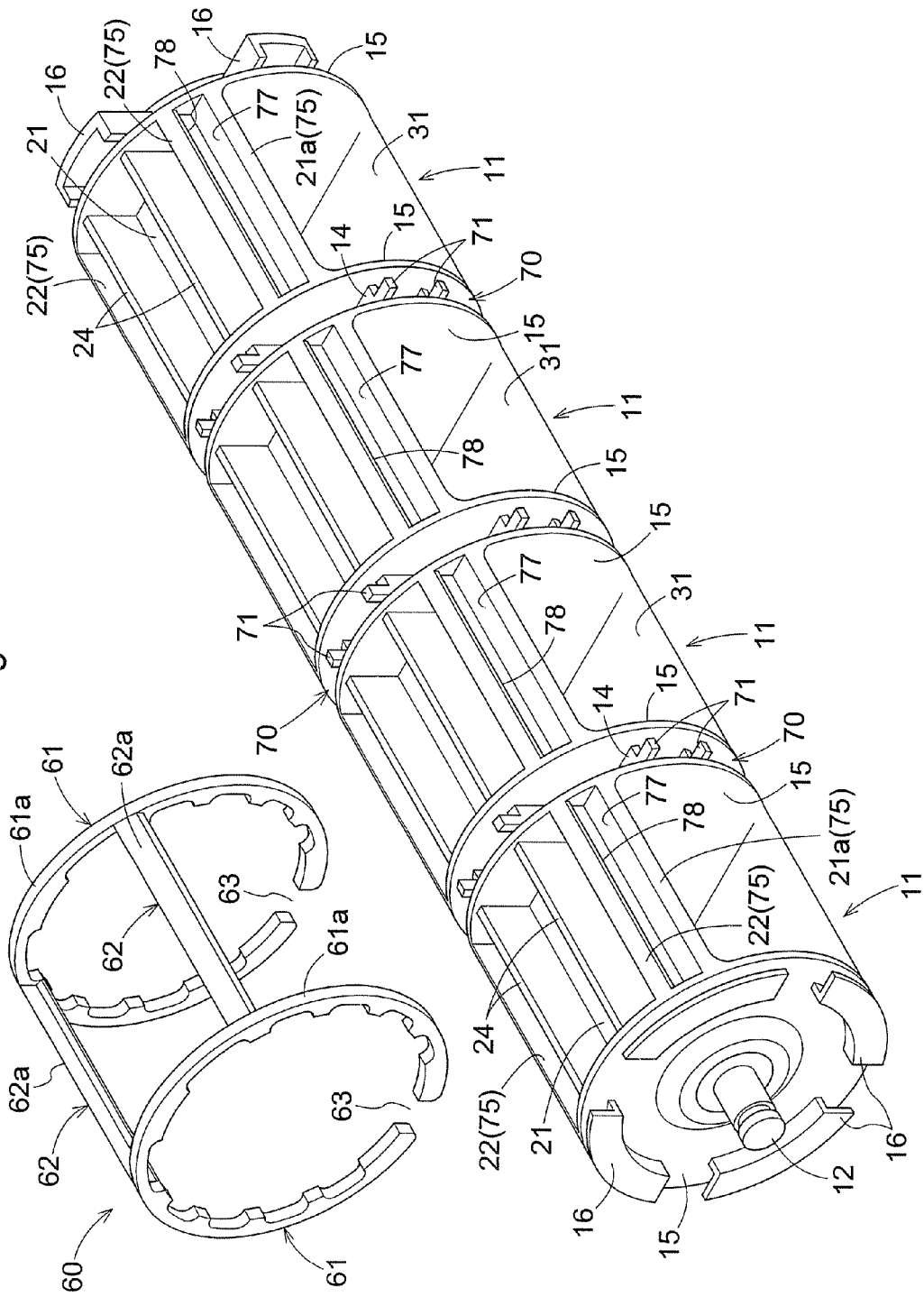
FIG. 8 is an overall perspective view of the rotary valve and a sealing member.
Figure 9:
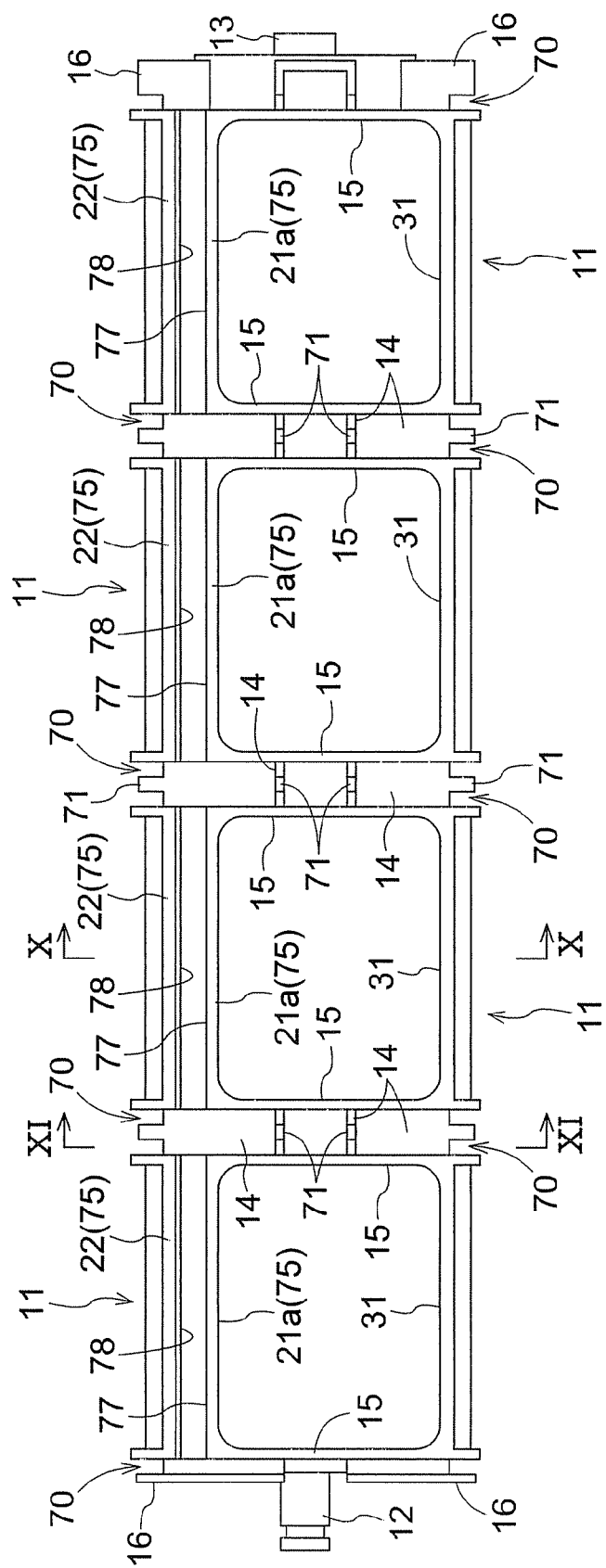
FIG. 9 is a front view of the rotary valve.
Figure 10:
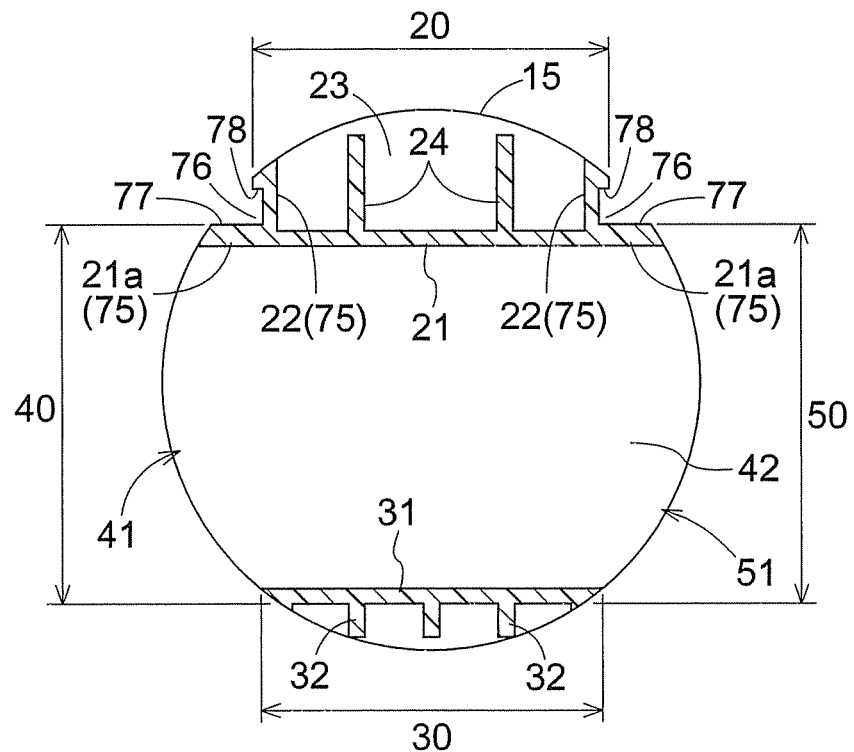
FIG. 10 is a sectional view taken along X-X in FIG. 9.
Figure 11:
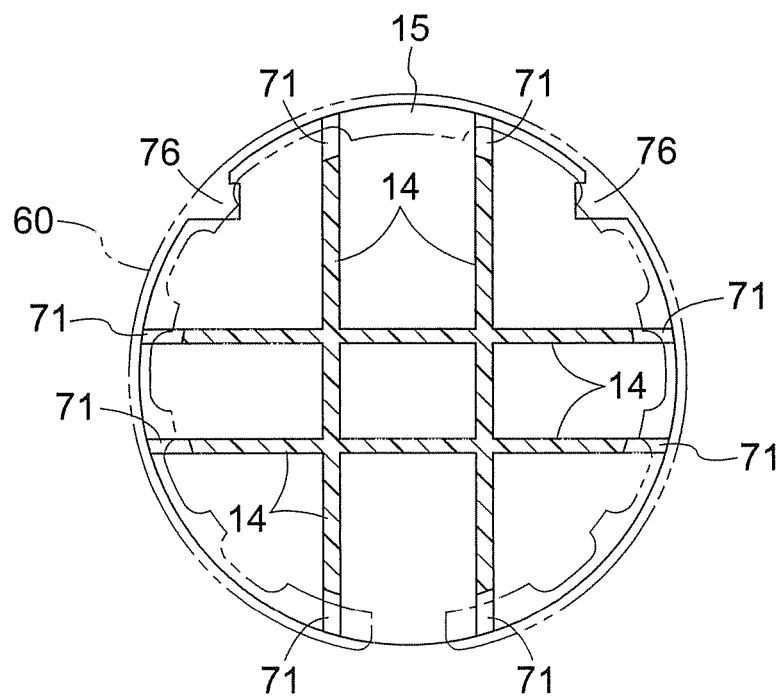
FIG. 11 is a sectional view taken along XI-XI in FIG. 9.

Next, the rotary valve 10 will be described in greater details. FIG. 3 shows a vertical section of the rotary valve 10. FIG. 8 is a perspective view showing the entire rotary valve 10. FIG. 9 is a front view showing the entire rotary valve 10. FIG. 10 is a sectional view taken along X-X in FIG. 9. FIG. 11 is a sectional view taken along XI-XI in FIG. 9.

As shown in these figures, the rotary valve 10 includes four valve portions 11, juxtaposed coaxially along the direction of the rotary axis P of this rotary valve 10 and the support shafts 12, 13 provided at the opposed ends of the rotary valve 10 to be rotatably supported to the axial bearing portions 1*b* of the intake manifold 1. The four valve portions 11 are formed by resin molding. Further, the four valve portions 11 are interconnected by a plurality of connecting members 14 formed by resin molding simultaneously and integral with the valve members 11 and juxtaposed along the peripheral direction of the valve portions 11 between respective adjacent valve portions 11, so that the valve portions 11 are rotatable together. The one support shaft 12 is a metal support shaft having one end thereof rotatably embedded in the extreme end of the rotary valve 10. This support shaft 12 is rotatably supported in a support hole formed in the axial bearing portion 1*b* via a resin bearing 18 and an O-ring 19 for axial alignment. The support hole of the axial bearing portion 1*b* is formed as a recessed portion configured to prevent air leak, to the outside of the intake manifold. The other support shaft 13 is formed integrally with the extreme end of the rotary valve 10 by resin molding. This support shaft 13 is supported to the axial bearing portion 1*b* via the output shaft 9*a* of the actuator 9. The four valve portions 11 correspond respectively to the four short ports 6 and open and close the feed switch openings 7. The rotary valve 10 includes a plurality of circular-disc-shaped side plate portions 15 disposed side by side and spaced apart along the direction of its rotational axis P. And, the rotary valve 10 is tapered with the side wall portion 15 disposed adjacent one end where the one support shaft 12 is present has an outer diameter slightly smaller than an outer diameter of the side wall portion 15 disposed at the other end where the other support shaft 13 is present. Each side wall portion 15 is formed as a substantially circular member about the rotational axis P as seen along the direction of this rotational axis P.

Each valve portion 11 includes a closed area portion 20 having a bottom plate member 21, a reinforcing area portion 30 disposed on the opposite side from the closed area portion 20 with respect to the rotational axis P which is the rotational axis of the valve portion II, an open area portion 40 disposed between and defined by the reinforcing area, portion 30 and the closed area portion 20 and having a port hole 41, and a communicating area portion 50 disposed on the opposite side from the open area portion 40 with respect to the rotational axis P of the valve portion 11 and having a communication hole 51. The communicating area portion 50 is preferably in unobstructed or uninterrupted communication with the open area, portion 40. Each bottom plate member 21, may have a flat surface that faces and defines a part of the open area portion 40 and communicating area portion 50.

The closed area portion 20 is defined by a pair of side plate portions 15 disposed at the opposed ends of the valve portion 11, the bottom plate member 21 formed continuously with the pair of the side plate portions 15, and a pair of wall plate members 22 disposed at opposed ends in the peripheral direction of the valve portion on the outward facing surface of the bottom plate member 21 such that the wall plate members 22 extend away from and preferably perpendicular to the bottom plate member 21. This closed area, portion 20 includes a recessed portion 23 (FIG. 10) defined between the wall plate members 22 on the outer face side of the bottom plate member 21 and a plurality of reinforcing ribs 24 provided within the recessed portion 23 and on the outer face side of the bottom plate member 21 such that reinforcing ribs 24 extend away from and preferably perpendicular to the bottom plate member 21.

The reinforcing area portion 30 is defined by the pair of side plate portions 15, and a reinforcing plate member 31 formed continuously with an adjacent pair of side plate portions 15. And, this reinforcing area portion 30 includes a plurality of reinforcing ribs 32 juxtaposed on the outer face side of the reinforcing plate 31 such that the reinforcing ribs 32 are spaced apart in the peripheral direction of the valve portion 11.

The open area portion 40 includes one radial end portion of a cylindrical member 42 defined by the pair of side plate portions 15, the bottom plate member 21, and the reinforcing plate member 31, and the port 41 which is an opening provided at one radial end portion of the cylindrical member 42. The communicating area portion 50 includes a radial end portion on the opposite side of the cylindrical member 42 and the communication hole 51 which is an opening provided at the radially opposite end portion of the cylindrical member 42. The port 41 and the communication hole 51 are communicated with each other via the cylindrical member 42.

As shown in FIG. 3, the rotary valve 10 includes a sealing member 60 attached to each valve portion 11. FIG. 8 is a perspective view showing the sealing member 60 in its entirety. As shown in this figure, the sealing member 60 has a pair of circular ring portions 61 and a pair of interconnecting portions 62 interconnecting the pair of ring portions 61. The interconnecting portions 62 will be referred to as ladder portions 62. However, while an exemplary structure of the ladder portions will be described below, the term ladder per se is not limiting as to their shapes. The pair of ring portions 61, 61 and the pair of ladder portions 62 are formed integrally by resin molding. Each ring portion 61 has an opening or a cut out 63 disposed on a radially opposite side from the side where the pair of ladder portions 62 is present, with respect to the center of this ring portion 61. Each ladder portion 62 has an outer peripheral face or edge 62a which is formed as an arcuate face which is preferably substantially circular except for the opening or the cut out 63 as viewed along the direction of the rotational axis P of the valve portion 11. The outer diameter of the sealing member 60 at each ladder portion 62, that is, a distance between an outer surface of each ladder portion 62 and the center of the ring portion 61 is set slightly smaller than the outer diameter thereof at each ring portion 61.

The sealing member 60 of each valve portion 11 is attached to the valve portion 11 by the following attaching arrangement. This attaching arrangement is shown in FIGS. 3 through 11.

As shown in these figures, a ring support portion 70 is provided on each axially outer side of the side plate portion 15 at each opposite end of the valve portion 11. Each ring support portion 70 disposed between adjacent valve portions 11 is defined by the side plate portion 15, each connecting member 14 and a pin member 71 formed continuously with the associated connecting member 14. This ring support portion 70 is provided in the form of an annular groove including a groove bottom defined by end faces of each connecting member 14 and side walls defined by the side plate portion 15 and the pin member 71. The ring support portion 70 included in each of the valve portions 11 disposed at the opposite ends of the rotary valve 1 on the side thereof opposite from the adjacent valve portion 11 is defined by the side plate portion 15 and a plurality of support members 16 distributed on the axially outer face side of this side plate portion 15 along the peripheral direction of the valve portion 11. This ring support portion 70 is provided in the form of an annular groove including a groove bottom defined by the side plate of each support member 16 and a side wall defined by the side plate portion 15.

Figure 5:
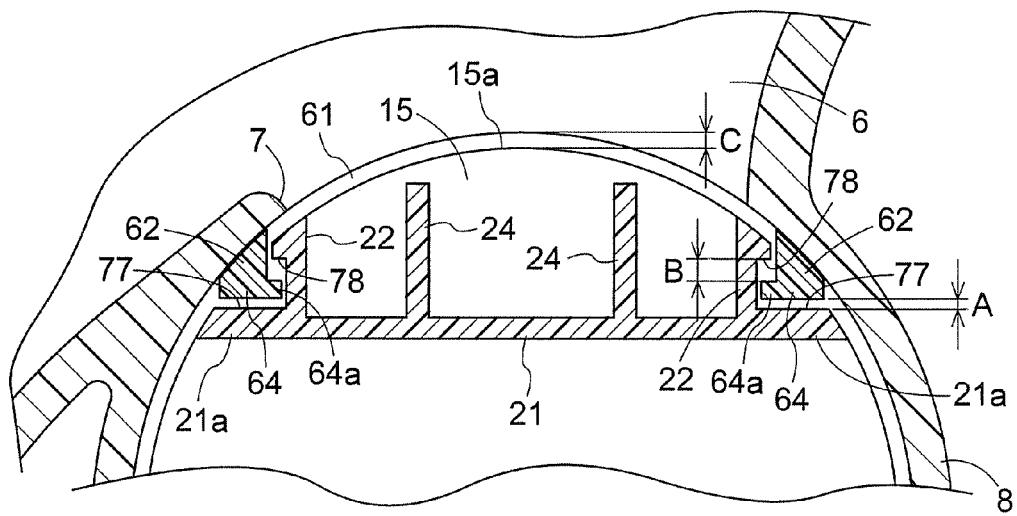
FIG. 5 is a sectional view showing a closed condition or a closed position of a valve portion.

FIGS. 3, 5 and 11 illustrate the valve portions 11 with the respective sealing members 60 attached or fitted. In FIG. 11, the ring portion 61 is shown with dotted lines. As shown in these figures, each of the pair of ring portions 61 is fitted to, or engages and rests on corresponding one of the pair of ring support portions 70, 70 from radially outside. Each ring portion 61 is elastically deformed to have a reduced diameter by a force applied thereto due to its contact with the bore portion 8. The deformation is allowed by the opening or the cut out 63. The ring portion 61 engages, mounted to, or fits onto the ring support portion 70 from radially outside under this elastically deformed condition. As a result, an outer peripheral face 61a of each ring portion 61 is pressed against the inner face of the bore portion 8. To fit the ring portion 61 onto the ring support portion 70, the ring portion 61 is elastically deformed to increase the diameter and to enlarge the opening 63, so that the ring member 61 may engage the ring support portion 70 from radially outside through the enlarged opening 63.

Figure 6:
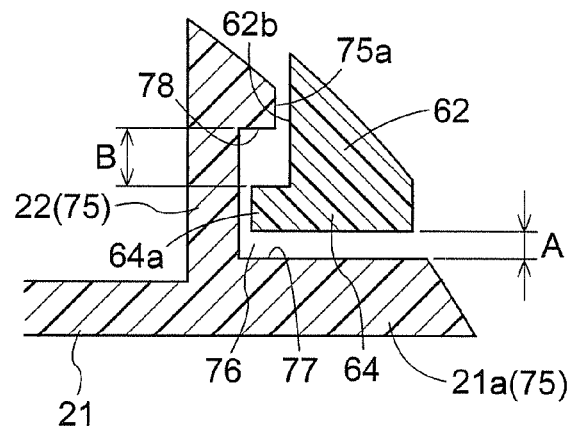
FIG. 6 is a sectional view showing an engaging portion and a recessed portion.

As shown in FIG. 5, each ladder portion 62 includes, on the inner side of the sealing member, a ladder engaging portion 64 (or an engaging portion) extending along the entire length of the ladder portion 62. This ladder engaging portion 64 includes a ridge or an elongate projection 64a extending along the entire length of the ladder portion 62. The ridges or the elongate projections 64a of the pair of ladder portions 62 project toward each other in an axial view. On the other hand, as best seen in FIG. 6, the valve portion 11 includes a pair of ladder support portions 75 disposed on the outward sides of the closed area portion 20 in the valve rotational direction. Each ladder support portion 75 is defined by an end portion 21a of the bottom plate member 21 and the wail plate member 22. In the valve portion outer face side of each ladder support portion 75, there is provided a ladder receiving recessed portion 76 (or a recessed portion). Each of the pair of ladder engaging portions 64 is engaged and received in the respective one of the pair of ladder receiving recessed portions 76.

Figure 4:
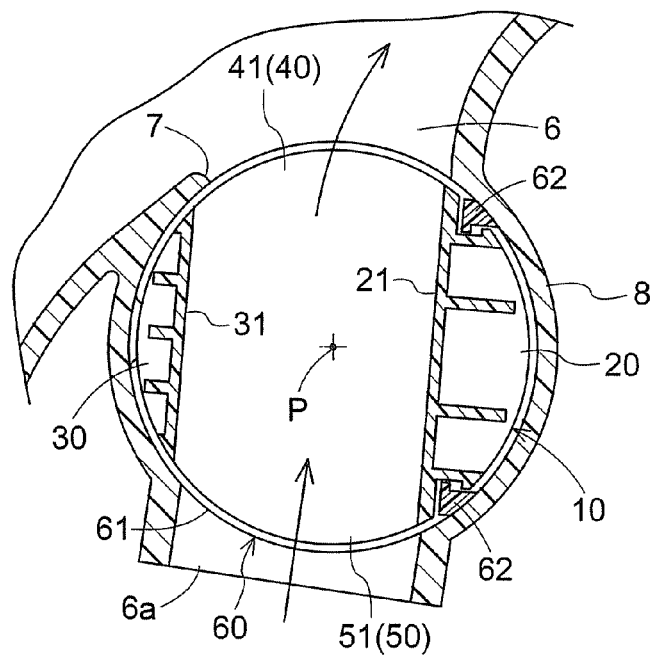
FIG. 4 is a sectional view showing an open condition or an open position of the short ports.

FIG. 4 is a sectional view showing each short port 6 and each valve portion 11 when the rotary valve 10 is switched to the open condition or the open position.

As shown in this figure, when the rotary valve 10 is switched to the open condition or the open position, the open area portion 40 of the valve portion 11 faces the feed switch opening 7, thus opening the feed switch opening 7 through the port 41. At this time, the communication hole 51 of the communicating area portion 50 faces the inlet opening 6a of the short port 6 and the feed switch opening 7 is in communication with the inlet opening 6a. At this time, the outer peripheral faces of the two ring portions 61 of the sealing member 60 project radially beyond the outer peripheral edge of the open area portion 40 to the outer periphery side of the open area portion 40 so as to be in contact with the inner peripheral faces of the bore portion 8 at positions along end regions of the feed switch opening 7 in the rotational axis direction of the valve portion 11 due to the elastic force from the ring portion 61. As a result, the ring portions 61 seal the gaps between the valve portion 11 and the bore portion 8 on the both end sides of the feed switch opening 7 in the direction of the rotational axis of the valve portion, thereby reducing turbulence, in the vicinity of the feed switch opening 7, in the air fed to the internal combustion engine 2 through the short port 6.

Figure 2:
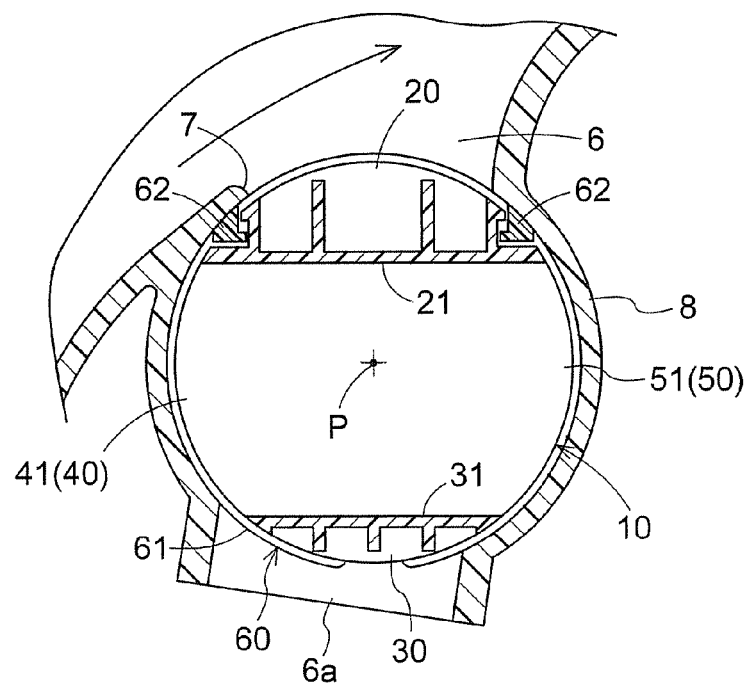
FIG. 2 is a sectional view showing a closed condition or closed position of short ports.

FIG. 2 is a sectional view showing each short port 6 and each valve portion 11 when the rotary valve 10 is switched to the closed condition or the closed position.

As shown in this figure, when the rotary valve 10 is switched to the closed condition or the closed position, the closed area portion 20 of the valve portion 11 faces the feed switch opening 7, thus closing the feed switch opening 7 with the side plate portion 15, the wall plate member 22 and the bottom plate member 21. At this time, the outer peripheral faces of the two ring portions 61 of the sealing member 60 project radially beyond the outer peripheral edge of the closed area portion 20 to the outer periphery side of the closed area portion 20 so as to be in contact with the inner peripheral faces of the bore portion 8 at positions along end regions of the feed switch opening 7 in the rotational axis direction of the valve portion 11 due to the elastic resilience force from the ring portion 61. On the other hand, the pair of ladder portions 62, 62 are disposed on the opposite sides of the feed switch opening 7 with respect to the peripheral direction of the valve portion 11 and disposed between the valve portion 11 and the bore portion 8 at positions on one side of the feed switch opening 7 in the peripheral direction of the valve portion 11. As a result, the ring portions 61 seal the gaps between the valve portion 11 and the bore portion 8 on both end sides of the feed switch opening 7 in the direction of the rotational axis of the valve portion 11 and the ladder portions 62 seal the gaps between the valve portion 11 and the bore portion 8 on both end sides of the feed switch opening 7 in the peripheral direction of the valve portion 11. However, the outer peripheral face 62a of each ladder portion 62 is slightly receded toward the inner side of the valve portion 11 than the outer peripheral face 61a of the ring portion 61, thus is not in contact with the inner peripheral face of the bore portion 8.

FIGS. 5 and 6 show how each ladder engaging portion 64 engages with the ladder receiving recessed portion 76 when the rotary valve 10 is switched to the closed condition or the closed position.

As shown in these figures, the inner faces of the ladder receiving recessed portion 76 includes a first inner face portion 77 and a second inner face portion 78. The first inner face portion 77 is disposed on the side opposite from the side where the feed switch opening 7 is present relative to the ladder engaging portion 64. That is, the first inner face portion 77 faces the ladder engaging portion 64. The second inner face portion 78 is disposed on the side where the feed switch opening 7 is present relative to the ladder engaging portion 64 such that the second inner face 78 faces the first inner face 77. A first sealing gap A is provided between the first inner face portion 77 and a portion of the ladder engaging portion 64 facing the first inner face portion 77. A second sealing gap B is provided between the second inner face portion 78 and a portion of the ladder engaging portion 64 opposed to the second inner face portion 78. The first sealing gap A and the second sealing gap B are provided respectively along the entire length of the first inner face portion 77 and the second inner face portion 78 along the direction of the rotational axis of the valve portion 11. On the other hand, the valve portion 11 is constructed such that a valve gap C is present between an outer peripheral edge 15a of the valve portion 11 and the inner peripheral face of the bore portion 8. The first sealing gap A, the second sealing gap B and the valve gap C are set such that the first sealing gap A is smaller than the valve gap C, the first sealing gap A is smaller than the second sealing gap B, and the sum of the first sealing gap A and the second sealing gap B is greater than the valve gap C. The first inner face portion 77 is formed to a manufacturing precision with consideration to possible manufacturing variance or tolerance in this first inner face portion 77. Thus, the sealing distance A is provided so as to prevent the ladder portion 62 from being pressed against the bore portion 8 by the first inner face portion 77 during a normal operation.

When the rotary valve 10 is switched to the closed condition or the closed position, an end 75a of one ladder support portion 75 comes into contact with an end face 62b of the ladder portion 62 of the sealing member 60, whereby the sealing member 60 is rotated together with the valve portion 11.

Figure 7:
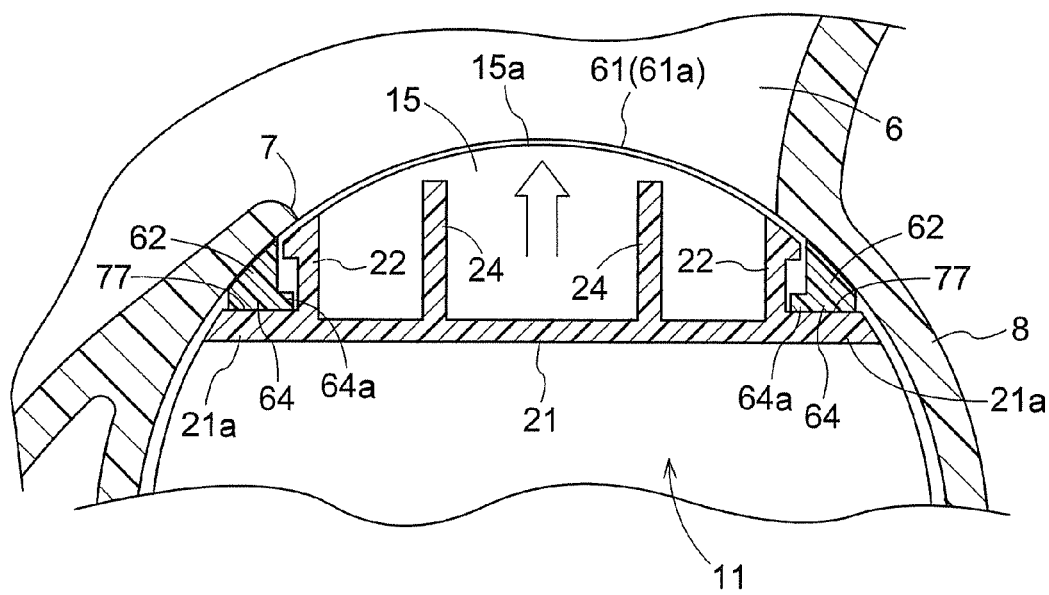
FIG. 7 is a sectional view showing a displaced condition of the valve portion.

When the valve portion 11 closes the feed switch opening 7, due to e.g. pulsation in the introduced air in the respective air feed passages 3 caused by operation of the internal combustion engine 2, a vibrations develop about the portions at opposite ends of the rotary valve 10 supported by the support shafts 12, 13. This causes the valve portion 11 and the sealing member 60 to move relative to each other within the grooves of the ring support portions 70 and inside the ladder receiving recessed portion 76. This causes deformation in the rotary valve 10 wherein each valve portion 11 repeatedly moves toward and away from the feed switch opening 7. FIG. 7 shows the valve portion 11 that is displaced toward the feed switch opening 7. As shown in this figure, when the displacement of the valve portion 11 reaches the sealing gap A, the first inner face portion 77 of the ladder receiving recessed portion 76 comes into contact with the ladder engaging portion 64. Since the outer peripheral face 61a of each ring portion 61 of the sealing member 60 is in contact with the corresponding inner peripheral face of the bore portion 8 and since the ladder portions 8 are supported to the bore portion 8 via the ring portions 61, the ladder portions 62 function as stoppers against further displacement of the first inner face portion 77, thus preventing further displacement of the valve portion 11. Also, since the sealing gap A prior to the deformation of the valve portion 11 is smaller than the valve gap C, in spite of the displacement of the valve portion 11, no collision will occur between the closed area portion 20 of the valve portion 11 and the bore portion 8, which prevents collision noise between the valve portion 11 and the bore portion 8 from occurring.

On the other hand, when the valve portion 11 is displaced away from the feed switch opening 7, even if the valve portion 11 is moved relative to the sealing member 60, the second inner face portion 78 of the ladder receiving recessed portion 76 does not come into contact with the ridge 64a of the ladder engaging portion 64 due to the presence of the second sealing gap B, whereby the sealing member 60 will not be moved away from the bore portion 8 by the valve portion 11.

When the rotary valve 10 is switched to the open condition or the open position, at one ladder support portion 75, its end 75a comes into contact with the end face 62b of the ladder portion 62 and the sealing member 60 is rotated by the valve portion 11. Further, rotation of the valve portion 11 is facilitated by the fact that the ladder portion 62 is not in contact with the bore portion 8.

Second Embodiment

Figure 12:
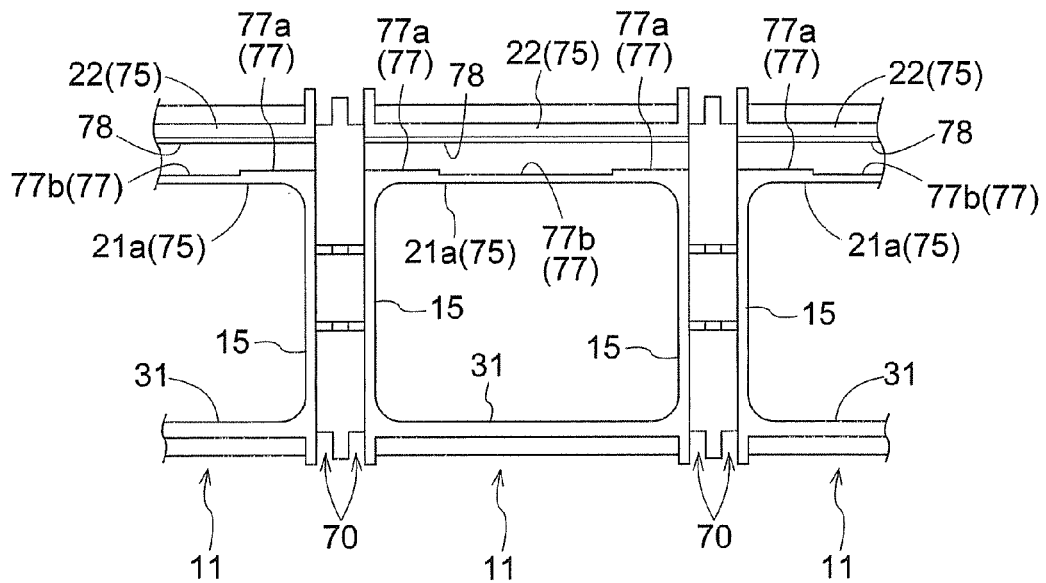
FIG. 12 is a front view of valve portions of the rotary valve according to the second embodiment.
Figure 13:
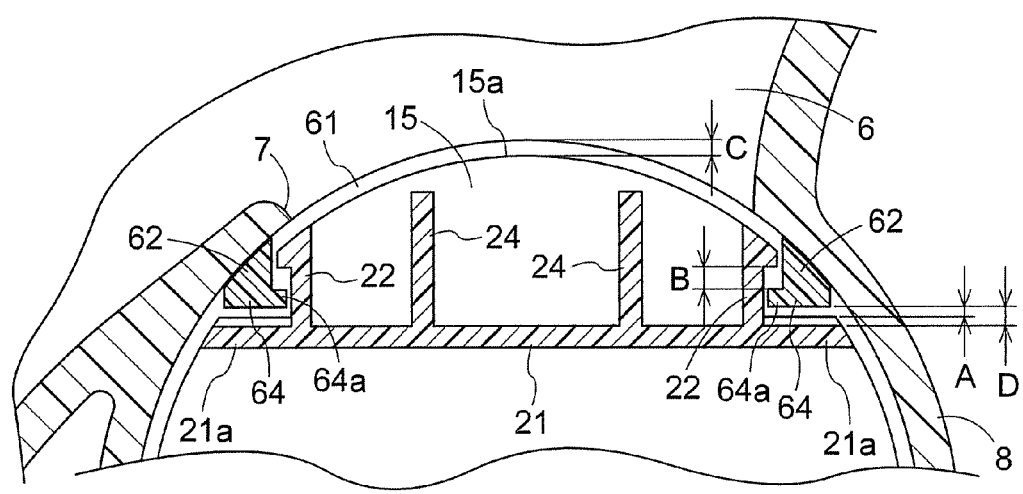
FIG. 13 is a sectional view showing a closed condition or a closed position of the valve portion of the rotary valve according to the second embodiment.
Figure 14:
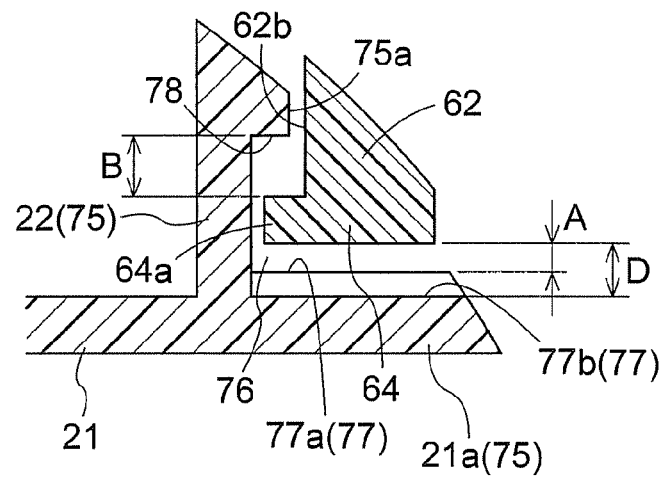
FIG. 14 is a sectional view showing the engaging portion and a recessed portion of the rotary valve according to the second embodiment.

FIGS. 12, 13 and 14 show valve portions 11 of a rotary valve 10 in accordance with the second embodiment of the invention. FIG. 12 is a front view of the valve portions 11. FIGS. 13 and 14 are sectional views showing the valve portion 11 when the rotary valve 10 is switched to the closed condition or the closed position. FIGS. 13 and 14 show how the ladder engaging portion 64 engages the ladder receiving recessed portion 76 when the feed switch opening 7 is closed by the valve portion 11.

As shown in these figures, the inner face of the ladder receiving recessed portion 76 of the valve portion 11 includes an first inner face portion 77 located, with respect to the ladder engaging portion 64, on the side opposite from the side where the feed switch opening 7 is present when the rotary valve 10 is switched to the closed condition or the closed position and a second inner face portion 78 which is located, with respect to the ladder engaging portion 64, on the side where the feed switch opening 7 is present. The first inner face portion 77 includes first portions 77a and a second portion 77b which are spaced by different distances from the portion of the ladder engaging portion 64 facing the first inner face portion 77. The first portions 77a are provided at opposite ends of the first inner face 77 relative to the direction of the rotational axis of the valve portion 11, whereas the second portion 77b is provided between the two first portions 77a.

A sealing gap A is provided between the respective first portions 77a and the ladder engaging portion 64. A sealing gap D is provided between the second portion 77b and the ladder engaging portion 64. The sealing gap A is set to be smaller than the sealing gap D. A second sealing gap B is provided between the second inner face portion 78 and the portion of the ladder engaging portion 64 facing the second inner face portion 78. A valve gap C is provided between the outer peripheral edge 15a of the valve portion and the inner peripheral face of the bore portion 8.

The above described sealing gap A, sealing gap B and valve gap C are identical to the sealing gap A, the second sealing gap B and the valve gap C described in the first embodiment. Therefore, the sealing gap A, the second sealing gap B and the valve gap C are set such that the sealing gap A is less than the valve gap C, the sealing gap A is less than the second sealing gap B, and the sum of the sealing gap A and the second sealing gap B is greater than the valve gap C. The first portion 77a is formed with manufacturing precision taking into consideration possible manufacturing tolerance or variations at this first portion 77a. As a result, the sealing gap A is provided so as to prevent the ladder portion 62 from being pressed against the bore portion 8 by the first portion 77a.

That is, even when the valve portion 11 is displaced toward the feed switch opening 7, if this displacement reaches the sealing gap A, each first portion 77a of the first inner face portion 77 comes into contact with the ladder engaging portion 64, whereby the ladder portion 62 comes into contact with the pair of first portions 77a, thereby preventing further displacement of the valve portion 11. As result, no collision will occur between the closed area portion 20 of each valve portion 11 and the bore portion 8. The second portion 77b of the inner face portion 77 is formed with lower manufacturing precision than the first portions 77a.

Third Embodiment

Figure 15:
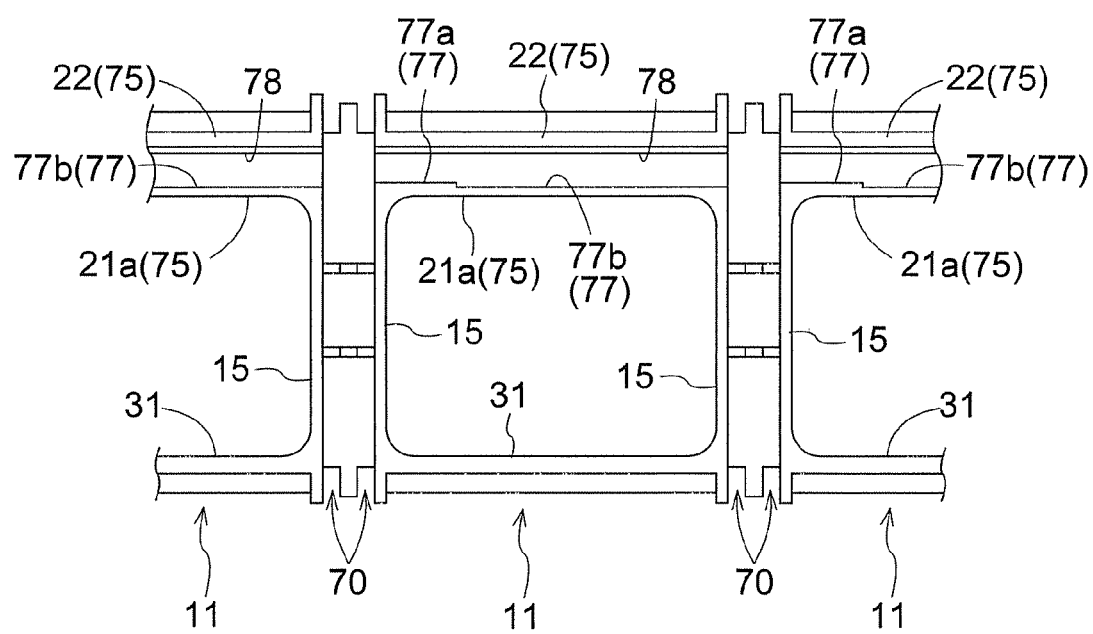
FIG. 15 is a front view of the valve portions of a rotary valve according to the third embodiment.

FIG. 15 shows valve portions 11 of a rotary valve 10 in accordance with a third embodiment of the invention. The inner face of the ladder receiving recessed portion 76 of each valve portion 11 of this rotary valve 10 includes a first inner face portion 77 which is located, with respect to the ladder engaging portion 64, on the side opposite from the side where the feed switch opening 7 is present when the rotary valve 10 is switched to the closed condition or the closed position and a second inner face portion 78 which is located, with respect to the ladder engaging portion 64, on the side where the feed switch opening 7 is present. The first inner face portion 77 includes a first portion 77a and a second portion 77b which are spaced by different distances from the portion of the ladder engaging portion 64 facing the first inner face portion 77. The first portion 77a, is provided at one of the opposite ends of the first inner face 77 relative to the direction of the rotational axis of the valve portion 11, i.e. the smaller-diameter side end in direction of tapering in the rotary valve 10. The second portion 77b is provided at the other end side relative to the direction of the rotational axis of the valve portion 11.

The first portion 77a, and the second portion 77b differ from those of the valve portion 11 in the second embodiment, in their positioning in the first inner face portion 77, but are identical in the respective distances relative to the ladder engaging portion 64. That is, they have the same arrangements as shown in FIGS. 13 and 14.

More specifically, A sealing gap A is provided between the first portion 77a, and the ladder engaging portion 64. A sealing gap D is provided between the second portion 77b and the ladder engaging portion 64. And, the sealing gap A is set to be smaller than the sealing gap D. A second sealing gap B is provided between the second inner face portion 78 and the portion of the ladder engaging portion 64 facing the second inner face portion 78. A valve gap C is provided between the outer peripheral edge 15a of the valve portion 11 and the inner peripheral face of the bore portion 8.

The above described sealing gap A, sealing gap B and valve gap C are identical to the sealing gap A, the second sealing gap B and the valve gap C described in the first embodiment. That is to say, the sealing gap A, the second sealing gap B and the valve gap C are set such that the sealing gap A is smaller than the valve gap C, the sealing gap A is smaller than the second sealing gap B, and the sum of the sealing gap A and the second sealing gap B is greater than the valve gap C. The first portion 77a is formed with manufacturing precision taking into consideration possible manufacturing tolerance or variations at this first portion 77a. As a result, the sealing gap A is provided so as to prevent the ladder portion 62 from being pressed against the bore portion 8 by the first portion 77a.

That is, even when the valve portion 11 is displaced toward the feed switch opening 7, if this displacement reaches the sealing gap A, the first portion 77a of the first inner face portions 77 come into contact with the ladder engaging portions 64, whereby the ladder portions 62 function as stoppers against further displacement of the first portion 77a, thereby preventing further displacement of that end of the valve portion 11. At this time, at the end of the valve portion 11 where the second portion 77b is present, a contact occurs between the first portion 77a and the ladder engaging portion 64 in the valve portion 11 adjacent this valve portion 11, so that the ladder portions 62 function as stoppers against a further displacement of the first portion 77a, thereby preventing further displacement of the valve portion 11. As a result, at each valve portion 11, no collision will occur between the closed area portion 20 of the valve portion 11 and the bore portion 8. The second portion 77b of the first inner face portion 77 is formed with lower manufacturing precision than the first portions 77a.

Other Embodiment

In place of the rotary valves 10 in the foregoing embodiments having four valve portions 11, the present invention may be applied to an intake apparatus for an internal combustion engine comprising a rotary valve having a plurality of valves, other than four, such as three, six valves, etc.

There may be more than two ladder or interconnecting portions. A person skilled in the art will be able to choose appropriate locations for additional interconnecting portion(s).

The invention claimed is:

1. An intake apparatus for an internal combustion engine, the apparatus comprising:
an intake manifold including a plurality of air feeding passages that define feed switch openings and a bore portion and that are adapted to be connected to and feed air to a plurality of cylinders of an internal combustion engine when the air feeding passages are connected to the internal combustion engine;
a rotary valve defining an axial direction and including a plurality of valve portions that are rotatable together and each of which is in communication with corresponding one of the air feeding passages through corresponding one of the feed switch openings, the rotary valve located in the bore portion and being supported to the intake manifold to be rotatably switched between an open position wherein the plurality of valve portions open the feed switch openings and a closed position wherein the plurality of valve portions close the feed switch openings;
a sealing member fitted to each of the valve portions, the sealing member including a pair of ring portions, each of which engages corresponding one of opposite ends of the valve portion in the axial direction and at least two interconnecting portions interconnecting the pair of ring portions, each of the sealing members providing sealing between associated one of valve portions and the bore portion of the intake manifold, the interconnecting portions being generally located along the feed switch opening and radially between the valve portion and the bore portion when the rotary valve is switched to the closed position; and
a pair of recessed portions defined on an outer side of each of said valve portions for receiving engaging portions defined on inner sides of the interconnecting portions of each of the sealing members, and
wherein when the rotary valve is switched to the closed position, a first sealing gap between the engaging portion and a first inner face portion of the recessed portion located on a side opposite, with respect to the engaging portion, from the other side where the feed switch opening is located, is set smaller than a valve gap provided between the valve portion and the bore portion, and
wherein when the rotary valve is switched to the closed position, a second sealing gap between the engaging portion and a second inner face portion of the receiving recessed portion located closer to the feed switch opening than the engaging portion is greater than the first sealing gap, and wherein a sum of the first sealing gap and the second sealing gap is greater than the valve gap.

2. The intake apparatus for an internal combustion engine, according to claim 1, wherein when the rotary valve is switched to the closed position, the first inner face portion of the receiving recessed portion located on the side opposite, with respect to the engaging portion, from a side where the feed switch opening is present includes a first portion with a third sealing gap between the first portion and the engaging portion and a second portion with a fourth sealing gap between the second portion and the engaging portion, and wherein the third sealing gap is smaller than the valve gap, and the fourth sealing gap is greater than the third sealing gap.

3. The intake apparatus for an internal combustion engine, according to claim 2, wherein the first portion of the first inner face portion of the receiving recessed portion is provided at each of opposite ends of the valve portion in the axial direction and the second portion of the first inner face portion of the receiving recessed portion is provided at an intermediate portion of the valve portion in the axial direction.

4. The intake apparatus for an internal combustion engine, according to claim 2, wherein the first portion of the first inner face portion of the receiving recessed portion is provided at one of opposite ends of the valve portion in the axial direction and the second portion of the first inner face portion of the receiving recessed portion is provided at the other of the opposite ends of the valve portion in the axial direction.

5. The intake apparatus for an internal combustion engine according to claim 1, wherein each engaging portion is positioned between the first inner face portion of one of the recessed portions and the second inner face portion of one of the recessed portions.

6. An intake apparatus for an internal combustion engine, the apparatus comprising:
an intake manifold including a plurality of air feeding passages that define feed switch openings and a bore portion and that are adapted to be connected to and feed air to a plurality of cylinders of an internal combustion engine when the air feeding passages are connected to the internal combustion engine;
a rotary valve defining an axial direction and including a plurality of valve portions that are rotatable together and each of which is in communication with corresponding one of the air feeding passages through corresponding one of the feed switch openings, the rotary valve located in the bore portion and being supported to the intake manifold to be rotatably switched between an open position wherein the plurality of valve portions open the feed switch openings and a closed position wherein the plurality of valve portions close the feed switch openings;
a sealing member fitted to each of the valve portions, the sealing member including a pair of ring portions, each of which engages corresponding one of opposite ends of the valve portion in the axial direction and at least two interconnecting portions interconnecting the pair of ring portions, each of the sealing members providing sealing between associated one of valve portions and the bore portion of the intake manifold, the interconnecting portions being generally located along the feed switch opening and radially between the valve portion and the bore portion when the rotary valve is switched to the closed position;
each valve portion including a wall plate member and a recessed portion on an outer side of the wall plate member, each recessed portion having a first inner face portion and a second inner face portion facing each other and positioned on opposite sides of the recessed portion;
each interconnecting portion including an engaging portion on an inner side of the interconnecting portion;
wherein when the rotary valve is switched to the closed position, a first sealing gap between one of the engaging portions and the first inner face portion of one of the recessed portions located on a side opposite, with respect to the engaging portion, from the other side where the feed switch opening is located, is set smaller than a valve gap provided between the valve portion and the bore portion; and
wherein when the rotary valve is switched to the closed position, a second sealing gap between one of the engaging portions and the second inner face portion of one of the recessed portions located closer to the feed switch opening than the engaging portion is greater than the first sealing gap, and wherein a sum of the first sealing gap and the second sealing gap is greater than the valve gap.

7. The intake apparatus for an internal combustion engine, according to claim 6, wherein when the rotary valve is switched to the closed position, the first inner face portion of the receiving recessed portion located on the side opposite, with respect to the engaging portion, from a side where the feed switch opening is present includes a first portion with a third sealing gap between the first portion and the engaging portion and a second portion with a fourth sealing gap between the second portion and the engaging portion, and wherein the third sealing gap is smaller than the valve gap, and the fourth sealing gap is greater than the third sealing gap.

8. The intake apparatus for an internal combustion engine, according to claim 7, wherein the first portion of the first inner face portion of the receiving recessed portion is provided at each of opposite ends of the valve portion in the axial direction and the second portion of the first inner face portion of the receiving recessed portion is provided at an intermediate portion of the valve portion in the axial direction.

9. The intake apparatus for an internal combustion engine, according to claim 7, wherein the first portion of the first inner face portion of the receiving recessed portion is provided at one of opposite ends of the valve portion in the axial direction and the second portion of the first inner face portion of the receiving recessed portion is provided at the other of the opposite ends of the valve portion in the axial direction.

* * * * *